US012735526B2

(12) United States Patent
Reithmeier et al.

(10) Patent No.: US 12,735,526 B2
(45) Date of Patent: Sep. 15, 2026

(54) POLYURETHANE-REACTIVE SYSTEM FOR PULTRUSION

(71) Applicant: Covestro Deutschland AG, Leverkusen (DE)

(72) Inventors: Richard Reithmeier, Cologne (DE); Andreas Hoffmann, Pulheim (DE); Harald Rasselnberg, Dormagen (DE); Heike Schmidt, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 754 days.

(21) Appl. No.: 18/004,318

(22) PCT Filed: Jul. 13, 2021

(86) PCT No.: PCT/EP2021/069394

§ 371 (c)(1), (2) Date: Jan. 5, 2023

(87) PCT Pub. No.: WO2022/013182

PCT Pub. Date: Jan. 20, 2022

(65) Prior Publication Data

US 2023/0250215 A1 Aug. 10, 2023

(30) Foreign Application Priority Data

Jul. 15, 2020 (EP) .................................... 20185854

(51) Int. Cl.

| | |
|---|---|
| ***C08G 18/48*** | (2006.01) |
| ***C08G 18/24*** | (2006.01) |
| ***C08G 18/76*** | (2006.01) |
| ***C08J 5/04*** | (2006.01) |
| ***C08J 5/10*** | (2006.01) |
| ***C08K 3/04*** | (2006.01) |
| ***C08K 5/101*** | (2006.01) |
| ***C08K 5/353*** | (2006.01) |
| ***C08K 7/06*** | (2006.01) |

(52) U.S. Cl.

CPC ....... *C08G 18/4825* (2013.01); *C08G 18/242* (2013.01); *C08G 18/4829* (2013.01); *C08G 18/485* (2013.01); *C08G 18/7664* (2013.01); *C08J 5/042* (2013.01); *C08J 5/10* (2013.01); *C08K 3/04* (2013.01); *C08K 5/101* (2013.01); *C08K 5/353* (2013.01); *C08K 7/06* (2013.01); *C08J 2375/08* (2013.01)

(58) Field of Classification Search

CPC .............. C08G 18/4825; C08G 18/242; C08G 18/4829; C08G 18/485; C08G 18/7664; C08J 5/042; C08J 5/10; C08J 2375/08; C08J 2375/04; C08K 3/04; C08K 5/101; C08K 5/353; C08K 7/06

See application file for complete search history.

(56) References Cited

U.S. PATENT DOCUMENTS

| | | | |
|---|---|---|---|
| 6,187,893 B1 | 2/2001 | Bruchmann et al. | |
| 7,625,954 B2 * | 12/2009 | Harre ................ | C08G 65/2663 521/137 |
| 8,663,414 B2 | 3/2014 | Nienkemper et al. | |
| 9,637,668 B2 | 5/2017 | Burckhardt et al. | |
| 11,142,616 B2 | 10/2021 | Neuhaus et al. | |
| 11,286,387 B2 | 3/2022 | Beisele et al. | |
| 11,447,595 B2 | 9/2022 | Wegener et al. | |
| 2006/0173128 A1 | 8/2006 | Connolly | |
| 2008/0090921 A1 | 4/2008 | Hayes et al. | |
| 2008/0090966 A1 | 4/2008 | Hayes et al. | |
| 2012/0302718 A1 | 11/2012 | Krause et al. | |
| 2013/0309924 A1 | 11/2013 | Wegener et al. | |
| 2015/0259465 A1 | 9/2015 | Burckhardt et al. | |
| 2018/0148536 A1 | 5/2018 | Goeschel et al. | |
| 2018/0327535 A1 | 11/2018 | Burckhardt et al. | |
| 2018/0371148 A1 | 12/2018 | Burckhardt et al. | |
| 2020/0062887 A1 | 2/2020 | Wegener et al. | |
| 2020/0079958 A1 | 3/2020 | Staff et al. | |

FOREIGN PATENT DOCUMENTS

| | | | | |
|---|---|---|---|---|
| CN | 104087231 A * | 10/2014 | | |
| CN | 105255159 A | 1/2016 | | |
| CN | 106700015 A | 5/2017 | | |
| JP | H101591 A | 1/1998 | | |
| WO | WO-2013127850 A1 * | 9/2013 | ................ | C08J 5/04 |
| WO | WO-2019149672 A2 * | 8/2019 | ................ | C08J 5/06 |

OTHER PUBLICATIONS

Ionescu, M., "Chemistry and Technology of Polyols for Polyurethanes", Rapra Technology Limited, Shawbury 2005, p. 31 et seq. (chapt. 3: The General Characteristics of Oligo-Polyols, p. 55 et seq. (chapt. 4: Oligo-Polyols for Elastic Polyurethanes), p. 263 et seq. (chapt. 8: Polyester Polyols for Elastic Polyurethanes), p. 321 et seq. (chapt. 13: Polyether Polyols for Rigid Polyurethane Foams) and p. 419 et seq. (chapt. 16: Polyester Polyols for Rigid Polyurethane Foams).

Kunststoff-Handbuch, vol. VII "Polyurethane", 3rd edition, Carl Hanser Verlag, Munich / Vienna, 1993, pp. 57-67 and pp. 88-90.

Kunststoff-Handbuch, vol. VII "Polyurethane", 3rd edition, Carl Hanser Verlag, Munich / Vienna, 1993, pp. 104-110.

Kunststoff-Handbuch, vol. VII, "Polyurethane", Carl Hanser Verlag, 3rd edition 1993, chapter 3.4.4 and 3.4.6 to 3.4.11.

International Search Report, PCT/EP2021/069394, date of mailing: Oct. 4, 2021, Authorized officer: Florian Paulus.

Shoujia, Zhao, A Brief Discussion on the Current Status and Trends of Domestic Polyurethane Waterproof Coatings, Polyurethane Industry, vol. 15, No. 03, Sep. 15, 2000, Abstract.

(Continued)

*Primary Examiner* — Robert S Jones, Jr.
*Assistant Examiner* — Joshua Caleb Bledsoe
(74) *Attorney, Agent, or Firm* — Donald R. Palladino

(57) ABSTRACT

The present invention relates to polyurethane-reactive systems for producing pultrudates containing reinforcing fibers, and their use.

20 Claims, No Drawings

(56) References Cited

OTHER PUBLICATIONS

Handbook of Chemical Fibers and Raw Materials, 1st edition, China National Chemical Fibers Corporation; China Textile & Apparel Press, Jun. 30, 1996, pp. 374-375.
Bianying, Wen et al., Polymer Materials Processing, 3rd edition, Jan. 31, 2022, pp. 30-32.

* cited by examiner

POLYURETHANE-REACTIVE SYSTEM FOR PULTRUSION

CROSS-REFERENCE TO RELATED APPLICATION

This application is a national stage application under 35 U.S.C. § 371 of PCT/EP2021/069394, filed Jul. 13, 2021, which claims the benefit of European Application No. 20185854.5, filed Jul. 15, 2020, each which is incorporated herein by reference.

FIELD

The present invention relates to polyurethane reactive systems for producing pultrudates with reinforcing fibers and to the use thereof.

BACKGROUND

Pultrusion is a continuous process for producing fiber-reinforced profiles of constant cross section. A pultrusion apparatus typically consists of an impregnation unit and a heated mold as well as a haul-off apparatus which keeps the process moving. Impregnation of the fibers is carried out in an open bath or in a closed injection box. For thermosetting reactive resins, for example polyurethanes, closed injection boxes are preferred. The injection boxes may be attached upstream of the actual mold as a separate unit or else may be integrated into the mold ("direct injection"). Molding and curing of the composite are then carried out in the heated mold. The finished profile is pulled from the mold by means of a haul-off apparatus and finally cut to the desired lengths.

To make the pultrusion process as efficient as possible high process speeds coupled with very good mechanical properties of the pultrudate and a high surface quality are sought. Low haul-off forces <3 kN especially reflect a fluid process. Different patents present different solutions for an effective pultrusion process with PU resins.

US2008/090966 A1 discloses a reaction system for producing a fiber-reinforced composite by the pultrusion process, said system being composed of a continuous fiber-reinforcing material and an immiscible polyurethane formulation containing a polyisocyanate component containing at least one polyisocyanate and an isocyanate-reactive component containing at least one isocyanate-reactive compound. It is described that incompatibility of the employed polyether polyols within the isocyanate-reactive compound and/or incompatibility between the isocyanate-reactive compound and the isocyanate makes it possible to achieve an improved pultrusion process.

It is customary to add insoluble solids to the isocyanate-reactive component as additives to fulfil particular functions that cannot be equally fulfilled by monophasic isocyanate-reactive components. These are therefore multiphase isocyanate-reactive components. Multiphase is defined as the occurrence of more than one phase at room temperature over 6 months. Additives employed for reaction control include for example solids as water binders (e.g. WO 2011/067246 A1, EP2018/059790), fillers, for example chalk, quartz sand and gypsum (EP3380539 A1), or encapsulated catalysts (WO 2018/162519 A1). In addition to the recited liquid/solid multiphasic character a liquid/liquid multiphasic character, similarly to what is observable in an oil/water mixture, often also occurs. Various publications even describe this phase instability as necessary for achieving low haul-off forces (for example US 2008/090966 A1).

In addition to the abovementioned advantages the multiphasic solid/liquid and/or liquid/liquid systems also have the following disadvantages. Thus for example the logistics of filling and transporting a multiphasic isocyanate-reactive component presents a great challenge since it is necessary to ensure the presence of a homogeneous mixture despite the multiphasic character. It is also necessary to ensure constant, sufficient commixing at the pultrusion apparatus in order to be able to achieve a consistent composition and thus profile quality in the pultrusion process. Filters are also installed in the metering unit in order to separate impurities from the impregnation resin for example. These filters can become blocked with solids in the formulation, thus bringing the process to a standstill. The pumps employed are also sensitive to the use of solids.

SUMMARY

It is accordingly an object of the present invention to develop a pultrusion process which at least partially overcomes the disadvantages of the known processes such as for example a multiphasic character of the isocyanate-reactive component and/or only partially adequate mechanical properties of the resulting pultrudate without excessively impairing the efficiency of this process. Transport of the reactive system to the pultrusion apparatus shall moreover be improved and the processability of the reactive system simplified by avoiding exposure of pumps and filters to solids. This object has surprisingly been achieved by the process according to the invention which has made it possible to obtain the polyurethane pultrudates according to the invention using the polyurethane reactive system according to the invention.

DETAILED DESCRIPTION

The present invention provides a polyurethane reactive system comprising

- an isocyanate component A),
- an isocyanate-reactive component B) comprising
  - 3-13% by weight of a polyether polyol B1) having a hydroxyl number (OHN) of 20 to 50 mg KOH/g obtainable by reaction of a first H-functional starter compound having a functionality f of ≥2 to ≤4 with ethylene oxide and propylene oxide,
  - 15-37% by weight of a polyether polyol B2) having a hydroxyl number (OHN) of 900-1100 mg KOH/g obtainable by reaction of a second H-functional starter compound having a functionality f of ≥2 to ≤4 with a second alkylene oxide,
  - 50-72% by weight of a polyether polyol B3) having a hydroxyl number (OHN)>50 to <900 mg KOH/g obtainable by reaction of a third H-functional starter compound with a third alkylene oxide,
- one or more catalysts B4) and
- a drying agent B5),
- wherein the sum of the % by weight of the components B1) and B2) ≤40% by weight based on the sum of the amounts of B), C) and D) and the sum of the % by weight of the components B1), B2), B3), B4) and B5) ≥90% by weight based on the sum of the amounts of B), C) and D),
- an internal release agent C),
- and optionally further auxiliary and additive substances D),
- wherein the % by weight of the components B), C) and optionally D) sum to 100% by weight and wherein the hydroxyl numbers (OHN) of the polyether polyols B1), B2) and B3) were determined using ISO 14900.

In one embodiment of the invention the components A), B), C) and optionally D) are employed in amounts such that the ratio of the number of NCO groups in (A) to the sum of the number of isocyanate-reactive groups in (B), (C) and (D) multiplied by 100 (the so-called index) has a value of 100-150.

An isocyanate-reactive component in the context of the present application is a component comprising compounds capable of reacting with the isocyanate group, for example hydroxyl groups (—OH), amine groups (—$NH_2$ or —NRH, wherein R is an organic residue) or thio groups (—SH).

The hydroxyl number (OHN) in the context of the present application is the amount of potassium hydroxide in milligrams which is equivalent to the amount of acetic acid bound in the acetylation of one gram of substance. For the present application the OHN was determined according to ISO 14900.

The polyisocyanate component A) preferably comprises at least one of monomeric methylenedi (phenyl isocyanate) (MDI), oligomeric MDI, polymeric MDI and mixtures thereof.

The NCO content of the polyisocyanate component A) is by preference more than 25% by weight, preferably more than 30% by weight, particularly preferably more than 31.5% by weight. The polyisocyanate component A) preferably has a functionality of 2.1 to 2.9. The viscosity of the polyisocyanate component A) is preferably ≤500 mPas (at 25° C.) measured according to DIN 53019-1.

Additionally employable are the customary aliphatic, cycloaliphatic, araliphatic di- and/or polyisocyanates and in particular aromatic isocyanates known from polyurethane chemistry. Examples of such suitable polyisocyanates are ethylene diisocyanate, 1,4-butylene diisocyanate, 1,5-pentane diisocyanate, 1,6-hexamethylene diisocyanate (HDI), 1,12-dodecane diisocyanate, cyclobutane-1,3-diisocyanate, cyclohexane-1,3-and-1,4-diisocyanate and mixtures of these isomers, isophorone diisocyanate (IPDI), 2,4- and 2,6-hexahydrotolylene diisocyanate and mixtures of these isomers, 2,2,4- and/or 2,4,4-trimethylhexamethylene diisocyanate, bis(4,4'-, 2,4'- and 2,2'-isocyanatocyclohexyl) methane or mixtures of these isomers and aromatic isocyanates of general formula R(NCO) z, wherein R is a polyvalent organic radical comprising an aromatic and z is an integer of at least 2. Examples thereof are 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-tolylene diisocyanate, 2,6-tolylene diisocyanate, mixtures of 2,4- and 2,6-tolylene diisocyanate, 1,5-naphthalene diisocyanate, 1-methoxy-2,4-phenylene diisocyanate, 4,4'-biphenylene diisocyanate, 3,3'-dimethyl-4,4'-diphenylmethane diisocyanate, and 3,3'-dimethyldiphenylmethane-4,4'-diisocyanate; triisocyanates, such as 4,4',4"-triphenylmethane triisocyanate and 2,4,6-toluene triisocyanate, and tetraisocyanates such as 4,4'-dimethyl-2,2'-5,5'-diphenylmethane tetraisocyanate and 1,3- and/or 1,4-bis(2-isocyanatoprop-2-yl)benzene (TMXDI), 1,3-bis(isocyanatomethyl)benzene (XDI).

Also employable in addition to the abovementioned isocyanates are modified isocyanates, for example those comprising a uretdione, isocyanurate, carbodiimide, uretonimine, allophanate or biuret structure, and also modified isocyanates in the form of prepolymers obtainable from the reaction of one or more polyisocyanates with one or more polyols. The isocyanate may possibly be a prepolymer obtainable by reaction of an isocyanate having an NCO functionality of ≥2 and polyols having a molecular weight of ≥62 g/mol to ≤8000 g/mol and OH functionalities from ≥1.5 to ≤6.

The polyisocyanate component A) is particularly preferably composed of monomeric MDI, oligomeric MDI, polymeric MDI or mixtures thereof.

The polyether polyol B1) according to the invention having a hydroxyl number (OHN) of 20 to 50 mg KOH/g is obtainable by reaction of a first H-functional starter compound having a functionality f of ≥2 to ≤4 with ethylene oxide and propylene oxide.

The polyether polyol B1) may be one or more polyol(s).

The first H-functional starter compound is preferably one or more compound(s) selected from the group consisting of ethylene glycol, propylene glycol, diethylene glycol, dipropylene glycol, triethylene glycol, tripropylene glycol, 1,4-butanediol, 1,6-hexanediol, glycerol, trimethylolpropane, pentaerythritol, ethylenediamine and triethanolamine, particularly preferably 1,2- and 1,3-propylene glycol, diethylene glycol, glycerol, trimethylolpropane and very particularly preferably glycerol and trimethylolpropane.

In one embodiment of the invention for the polyether polyol B1) the mass fraction of propylene oxide is 60% to 90% by weight, preferably 70% to 85% by weight, based on the sum of ethylene oxide and propylene oxide employed.

In a preferred embodiment of the invention the polyether polyol B1) is obtainable by i) reacting the first H-functional starter compound with propylene oxide in the presence of a first catalyst to form a first intermediate
ii) reacting the first intermediate with ethylene oxide to form a block copolymer.

In an alternative, less preferred embodiment of the invention the polyether polyol B1) is obtainable by copolymerization of ethylene oxide and propylene oxide onto the first H-functional starter compound in the presence of a first catalyst to form a copolymer.

In one embodiment of the invention the first catalyst is potassium hydroxide, sodium hydroxide, cesium hydroxide, a double metal cyanide (DMC) catalyst and/or an amine, preferably potassium hydroxide.

The polyether polyol B2) according to the invention having a hydroxyl number (OHN) of 900-1100 mg KOH/g is obtainable by reaction of a second H-functional starter compound having a functionality f of ≥2 to ≤4 with a second alkylene oxide.

The polyether polyol B2) may be one or more polyol(s).

The second H-functional starter compound is preferably one or more compound(s) selected from the group consisting of ethylene glycol, propylene glycol, diethylene glycol, dipropylene glycol, triethylene glycol, tripropylene glycol, 1,4-butanediol, 1,6-hexanediol, glycerol, trimethylolpropane, pentaerythritol, ethylenediamine and triethanolamine, particularly preferably 1,2- and 1,3-propylene glycol, diethylene glycol, glycerol, trimethylolpropane and very particularly preferably glycerol and trimethylolpropane.

In one embodiment of the invention the polyether polyol B2) is obtainable by copolymerization of the second alkylene oxide onto the second H-functional starter compound in the presence of a second catalyst.

In one embodiment of the invention the second catalyst is potassium hydroxide, sodium hydroxide, cesium hydroxide, a double metal cyanide (DMC) catalyst and/or an amine, preferably potassium hydroxide.

In one embodiment of the invention the second alkylene oxide is propylene oxide and/or ethylene oxide, preferably propylene oxide.

The polyether polyol B3) according to the invention having a hydroxyl number (OHN)>50 to <900 mg KOH/g is obtainable by reaction of a third H-functional starter compound with propylene oxide.

The polyether polyol B3) may be one or more polyol(s).

In one embodiment the third H-functional starter compound has a functionality f of ≥2 to ≤4.

The third H-functional starter compound is preferably one or more compound(s) selected from the group consisting of ethylene glycol, propylene glycol, diethylene glycol, dipropylene glycol, triethylene glycol, tripropylene glycol, 1,4-butanediol, 1,6-hexanediol, glycerol, trimethylolpropane, pentaerythritol, ethylenediamine and triethanolamine, particularly preferably 1,2- and 1,3-propylene glycol, diethylene glycol, glycerol, trimethylolpropane and very particularly preferably 1,2-propylene glycol, glycerol and trimethylolpropane.

In one embodiment of the invention the polyether polyol B3) is obtainable by copolymerization of the third alkylene oxide onto the third H-functional starter compound in the presence of a third catalyst.

In one embodiment of the invention the third catalyst is potassium hydroxide, sodium hydroxide, cesium hydroxide, a double metal cyanide (DMC) catalyst and/or an amine, preferably potassium hydroxide.

In one embodiment of the invention the third alkylene oxide is propylene oxide and/or ethylene oxide, preferably propylene oxide.

According to the invention it is possible to employ not only the polyols B1), B2) and B3) employed according to the invention in the isocyanate-reactive component B) but also further polyether polyols, further polyester polyols, further polyether ester polyols and/or further polycarbonate polyols. It is preferable when further polyether polyols and/or further polyester polyols, particularly preferably further polyether polyols, are employed in B).

In addition to the OH function the further polyols employed in the isocyanate-reactive component B) may also contain further isocyanate-reactive hydrogen atoms (=active hydrogen atoms), for example NH groups and $NH_2$ groups. To the extent that such further active hydrogen atoms are present, preferably more than 90%, in particular more than 95%, particularly preferably more than 99% and very particularly preferably 100% of all isocyanate-reactive hydrogen atoms in the isocyanate-reactive component originate from OH functions.

Such polyols are described for example by Ionescu in "Chemistry and Technology of Polyols for Polyurethanes", Rapra Technology Limited, Shawbury 2005, p. 31 et seq. (chapt. 3: The General Characteristics of Oligo-Polyols, p. 55 et seq. (chapt. 4: Oligo-Polyols for Elastic Polyurethanes), p. 263 et seq. (chapt. 8: Polyester Polyols for Elastic Polyurethanes) and in particular on p. 321 et seq. (chapt. 13: Polyether Polyols for Rigid Polyurethane Foams) and p. 419 et seq. (chapt. 16: Polyester Polyols for Rigid Polyurethane Foams).

Preferably employed in the isocyanate-reactive component B) are polyols producible in a manner known per se by polyaddition of alkylene oxides such as propylene oxide and/or ethylene oxide onto H-functional starter compounds in the presence of catalysts. The polyhydroxyl polyethers are preferably produced from an H-functional starter compound having on average 2 to 8 active hydrogen atoms and one or more alkylene oxides, for example ethylene oxide, butylene oxide and/or propylene oxide. Preferred starter compounds are molecules having two to eight hydroxyl groups per molecule, such as water, ethylene glycol, propylene glycol, diethylene glycol, dipropylene glycol, triethylene glycol, tripropylene glycol, 1,4-butanediol, 1,6-hexanediol, glycerol, trimethylolpropane, pentaerythritol, sorbitol and sucrose and aminic starter compounds such as ethylenediamine and triethanolamine, for example. The starter compounds may be used alone or in admixture. Particular preference is given to 1,2- and 1,3-propylene glycol, diethylene glycol, sorbitol, glycerol, trimethylolpropane, sucrose and mixtures of the recited products. Representatives of the isocyanate-reactive component B) are described for example in Kunststoff-Handbuch, volume VII "Polyurethane", 3rd edition, Carl Hanser Verlag, Munich/Vienna, 1993, pages 57-67 and pages 88-90.

The polyester polyols are polyhydroxyl compounds comprising ester groups, for example castor oil or polyhydroxyl polyesters, such as are obtainable by polycondensation of excess amounts of simple polyhydric alcohols of the type recited hereinabove by way of example with preferably dibasic carboxylic acids or their anhydrides, for example adipic acid, phthalic acid or phthalic anhydride.

Employable catalysts B4) include for example the known polyurethane catalysts, for example organic metal compounds, such as potassium or sodium salts of organic carboxylic acids, for example potassium acetate; likewise tin (II) salts of organic carboxylic acids, for example tin (II) acetate, tin (II) octoate, tin (II) ethylhexanoate and tin (II) laurate, and the dialkyltin (IV) salts of organic carboxylic acids, e.g. dibutyltin diacetate, dibutyltin dilaurate, dimethyltin dilaurate, dibutyltin maleate and dioctyltin diacetate, and also, for example, diisooctyl-2,2'-[(dioctylstannylene) bis(thio)] diacetate, di-n-butyl-bis(dodecylthio) tin, monooctyltin isooctylthioglycolate, isooctyl mercaptoacetate, 2-ethylhexyl-4,4'-dibutyl-10-ethyl-7-oxo-8-oxa-3,5-dithia-4-stanna tetradecanoate, dimethyltin dithioglycolate and/or strongly basic amines such as 2,2,2-diazabicyclooctane, N,N-dimethylaminopropylamine, N,N-bis(3-dimethylaminopropyl)-N-isopropanolamine, triethylamine, triethylenediamine, tetramethylhexamethylenediamine, pentamethyldiethylenetriamine, N,N-dimethylcyclohexylamine or bis(N,N-dimethylaminoethyl) ether, N,N-dimethylbenzylamine, N,N-methyldibenzylamine and N-methylimidazole, and latent catalysts. Latent catalysts and their mechanism of action are described for example in EP 2531538 A1, pages 1-4 and page 9, line 26 to page 10, line 2. Typical latent catalysts are blocked amine and amidine catalysts, for example catalysts from Air Products (for example Polycat® SA-1/10, Dabco K™ 60) and Tosoh Corporation (such as for instance Toyocat® DB 2, DB 30, DB 31, DB 40, DB 41, DB 42, DB 60, DB 70). Further representatives of catalysts and details concerning the mode of action of the catalysts are described in Kunststoff-Handbuch, volume VII "Polyurethane", 3rd edition, Carl Hanser Verlag, Munich/Vienna, 1993 on pages 104-110.

In one embodiment of the invention the amount of catalyst B4) is 0.05% by weight to 5% by weight, preferably 0.05% by weight to 2% by weight, based on the sum of the amounts of B), C) and D).

The drying agents B5) employed are preferably drying agents (water binders) that are liquid or dissolved at room temperature, i.e. 25° C. In the context of the present invention the terms "drying agent" and "water binder" are used synonymously.

In one embodiment of the invention the amount of drying agent B5) is not more than 5% by weight, preferably not more than 2% by weight, in each case based on the sum of the amounts of B), C) and D).

In one embodiment of the invention the amount of drying agent B5) is 0.05% by weight to 5% by weight, preferably 0.05% by weight to 2% by weight, in each case based on the sum of the amounts of B), C) and D).

In one embodiment of the invention the drying agent B5) is a trialkyl orthoformate, a p-toluenesulfonyl isocyanate, an oxazolidine or mixtures thereof, preferably an oxazolidine.

In a preferred embodiment the drying agent B5) is an oxazolidine and the oxazolidine 3-ethyl-2-methyl-2-(3-methylbutyl)-1,3-oxazolidine and/or N-butyl-2-(1-ethylpentyl)-1,3-oxazolidine, particularly preferably N-butyl-2-(1-ethylpentyl)-1,3-oxazolidine.

Employable internal release agents C) include all release agents customary in the production of polyurethanes, for example long-chain monocarboxylic acids, in particular fatty acids such as stearic acid, amines of long-chain carboxylic acids such as stearamide, fatty acid esters, metal salts of long-chain fatty acids such as zinc stearate or silicones. Particularly suitable are the internal release agents obtainable specifically for pultrusion, for example MOLD WIZ INT-1948 MCH, MOLD WIZ INT-1947 MCH, MOLD WIZ INT-1960 MCH obtainable from Axel Plastics or Luvotrent TL HB 550-D, Luvotrent TL HB 550, obtainable from Lehmann&Voss. The internal release agents are employed in amounts of 0.1-8% by weight, preferably 0.1-6% by weight and particularly preferably 0.1-4% by weight, based on the total weight of B).

Suitable auxiliary and additive substances D) include all auxiliary and additive substances known for the production of polyurethanes. Such substances are known and described for example in "Kunststoffhandbuch, volume 7, Polyurethane", Carl Hanser Verlag, 3rd edition 1993, chapter 3.4.4 and 3.4.6 to 3.4.11. They include for example surface-active substances, defoamers, emulsifiers, viscosity reducers, dyes, pigments, flame retardants and adhesion promoters.

The present invention further provides polyurethane composite materials comprising polyurethane obtainable from the polyurethane reactive system according to the invention and a fiber material. The fiber material is preferably at least one of inorganic fiber material, organic fiber material, metallic fiber material, natural fiber material and combinations thereof, in particular glass fiber material and carbon fiber material or combinations thereof, particularly preferably carbon fiber material.

The invention further provides a process for producing the polyurethane pultrudates according to the invention comprising the steps of:

i) mixing the components A), B), C) and optionally D) to obtain a polyurethane reactive system, ii) conveying the polyurethane reactive system from step i) into an injection box, iii) simultaneously with process step ii) introducing fiber material through the injection box to obtain a fiber material impregnated with the polyurethane reactive system, iv) introducing the fiber material impregnated with the polyurethane reactive system into a heated curing mold, V) curing the fiber material impregnated with the polyurethane reactive system in the curing mold to obtain a polyurethane pultrudate, vi) pulling the polyurethane pultrudate from step v) out of the curing mold using a pulling mechanism, vii) cutting the polyurethane pultrudate pulled from the curing mold to the desired length.

The mixing of the components A), B), C) and optionally D) may be effected in a manner customary for the production of polyurethane reactive mixtures, for example in a high pressure or low pressure process. It is preferable when the components B), C) and optionally D) are premixed and the resulting mixture is mixed with component A).

The temperature during impregnation of the fiber material in process step iii) is preferably 0-75° C., particularly preferably 10-50° C. and very particularly preferably 15-35° C. The curing step v) is preferably carried out at a temperature of the curing mold of 140-220° C., wherein the curing mold preferably comprises a plurality of zones, preferably 3 or 4, having different temperatures.

The fiber material is in the form of continuous fibers. In the context of the present application the term "continuous fibers" is to be understood as meaning fibers known to those skilled in the art, for example inorganic fibers, organic fibers, metallic fibers, natural fibers, preferably glass fibers and carbon fibers, particularly preferably carbon fibers. The term "continuous fiber" is to be understood as meaning a fiber material having a length of at least several meters. Said fibers are unwound, for example from rolls or spools. Fiber material that can be used here comprises individual fibers, known as fiber rovings, braided fibers, fiber mats, laid fiber scrims and woven fiber fabrics. In particular in the case of fiber composites such as braided fibers, twisted fibers or woven fiber fabrics it is possible that shorter individual fibers can also be present among the individual fibers present in these fiber composites. However, the fiber composite itself must take the form of continuous material. In a preferred embodiment of the invention the glass fibers are employed in the form of fiber rovings.

In a further preferred embodiment of the invention process step iii) comprises passing not only the fiber material but also so-called peel plies through the injection box such that these preferably form at least two exterior sides of the finished polyurethane pultrudate. In further processing of the polyurethane pultrudates according to the invention this peel ply can be removed from the exterior sides to form at least two rough surfaces, thus for example facilitating adhesive bonding of the polyurethane pultrudates.

The polyurethane pultrudates according to the invention may be used, for example, for producing reinforcing profiles or structural elements in vehicle construction, aircraft construction or of wind power plants. Such lightweight reinforcing profiles may be used for example for producing so-called "spar caps" in rotor blades of wind power plants.

The invention shall be more particularly elucidated in the examples which follow.

EXAMPLES

A pultrusion apparatus having a heatable mold with internal dimensions of 60 mm×5 mm and an injection box connected upstream of the mold was employed. Accordingly, right-angle profiles having a width of 60 mm and a wall thickness of 5 mm were produced. Carbon fiber rovings (Pyrofil® TRW 40 50L KNA from Mitsubishi Rayon Co. Ltd.) were used as the fiber material and pulled through the injection box and the mold. The concentration of carbon fibers in the finished profile was about 65% by volume. The polyol mixtures reported in table 1 were in each case admixed with the specified amount of internal release agent and subjected to intensive stirring. These mixtures were in each case mixed at 23° C. with sufficient isocyanate to achieve the respective NCO index reported in table 1 using a low-pressure mixing machine with a static mixer and the resulting polyurethane reactive system was continuously injected into the injection box. By means of the haul-off mechanism of the pultrusion apparatus the impregnated reinforcing fibers were continuously pulled through the heated mold and cured. The temperature control of the mold was divided into 3 zones with temperatures of 170° C. in zone 1 (mold inlet in haul-off direction), 200° C. in zone 2 (mold center) and 220° C. in zone 3 (mold outlet). The finished profiles were then continuously cut to the desired length.

The following starting materials were employed:

Isocyanate Component A)

MDI 1: Polymeric MDI having an NCO content of 32.4% by weight and a content of monomeric MDI of 80% by weight; the content of 2,4'-MDI and 2,2'-MDI sums to 25% by weight, Covestro Deutschland AG.

Isocyanate-Reactive Component B)

Polyether Polyols B1)

Polyol 6: Polyether polyol having an OHN=29 mg KOH/g and a propylene oxide (PO) content of 78.1% by weight based on the mass of PO and EO employed and an ethylene oxide (EO) content of 21.9% by weight based on the mass of PO and EO employed, obtainable by reaction of glycerol (F=3) with propylene oxide in the presence of a KOH catalyst and subsequent reaction of the propoxylated intermediate with ethylene oxide to form a polyether polyol block copolymer Polyether Polyols B2)

Polyol 2: Glycerol-started triol, propoxylated, OHN=1050 mg KOH/g

Polyether Polyols B3)

Polyol 1: Glycerol-started triol, propoxylated, OHN=235 mg KOH/g

Polyol 3: Glycerol-started triol, propoxylated, OHN=400 mg KOH/g

Polyol 5: Propylene glycol-started diol, propoxylated, OHN=515 mg KOH/g

Further Polyether Polyols

Polyol 4: Propylene glycol-started diol, propoxylated, OHN=28 mg KOH/g

Polyol 7: Polyether monool having an OHN=33 mg KOH/g and a propylene oxide (PO) content of 52.9% by weight based on the mass of PO and EO employed and an ethylene oxide (EO) content of 47.1% by weight based on the mass of PO and EO employed, obtainable by reaction of butyl diglycol (F=1) with propylene oxide and ethylene oxide in the presence of a KOH catalyst and subsequent reaction of this intermediate with propylene oxide to form a polyether monool block copolymer.

Catalysts B4)

Catalyst: Diisooctyl 2,2'-[(dioctylstannylene)bis(thio)]diacetate

Drying Agent B5) as Water Binder

Water binder 1: MOLSIV® L-powder from UOP

Water binder 2: Incozol-2 (N-butyl-2 (1-ethylpentyl)-1,3-oxazolidine) from Incorez Release agent C)

Internal release agent (IMR): Luvotrent® TL HB 550 from Lehmann&Voss for pultrusion All amounts in table 1 are reported in parts by weight. The mechanical parameters were determined by the following methods:

Transverse flexural stress: DIN EN ISO 14125

Axial flexural stress: DIN EN ISO 178

Transverse interlaminar shear strength (ILSS): DIN EN ISO 14130

Axial ILSS: DIN EN ISO 14130

In addition the haul-off force and haul-off speed were determined in the pultrusion apparatus during production of the polyurethane pultrudates, and fiber impregnation, surface quality and occurrence of abrasion were visually evaluated.

The test for monophasic character of the isocyanate-reactive components employed was also carried out visually. To this end, the isocyanate-reactive components employed in examples 1-6 were stored in transparent plastic containers at room temperature for 6 months and visually examined at regular intervals. Multiphasic character describes the occurrence of any inhomogeneity, such as for example phase separation, turbidity and droplet formation. Accordingly, a monophasic isocyanate-reactive component exhibits none of these effects over 6 months at room temperature. A monophasic isocyanate-reactive component is a homogeneous, clear liquid. In addition, a monophasic isocyanate-reactive component also does not exhibit any of the abovementioned effects of multiphasic character after centrifuging at 6000 rpm for 30 minutes.

TABLE 1

| | Ex. 1 | Ex. 2 (comp.) | Ex. 3 (comp.) | Ex. 4 (comp.) | Ex. 5 (comp.) | Ex. 6 (comp.) |
|---|---|---|---|---|---|---|
| Polyol 1 | 26.47 | 28.47 | 26.47 | 28.47 | 28.47 | 27.90 |
| Polyol 2 | 26.53 | 26.00 | 26.53 | 26.00 | 26.00 | 25.48 |
| Polyol 3 | 29.80 | 23.81 | 29.80 | 23.81 | 23.81 | 23.34 |
| Polyol 4 | | 9.79 | | 9.79 | 9.79 | |
| Polyol 5 | 8.90 | 9.26 | 8.897 | 9.26 | 9.26 | 9.08 |
| Polyol 6 | 7.30 | | 7.30 | | | |
| Polyol 7 | | | | | | 11.88 |
| Water binder 1: | | 2.00 | | | | |
| Water binder 2: | 0.50 | | | | 0.50 | 0.50 |
| Catalyst 1 | 0.50 | 0.67 | 0.50 | 0.67 | 0.67 | 1.47 |
| IMR | 4 | 4 | 4 | 4 | 4 | 4 |
| Isocyanate | MDI 1 | MDI 1 | MDI 1 | MDI 1 | MDI 1 | MDI 1 |
| Index | 115 | 115 | 115 | 115 | 115 | 115 |
| Solids in polyol | No | Yes | No | No | No | No |
| Polyol monophasic | Yes | No | Yes | No | No | Yes |
| Haul-off force <3 kN | Yes | Yes | No | No | No | No |
| Haul-off speed | 1.5 m/min | 1.5 m/min | max. 0.9 m/min | max. 0.9 m/min | max. 1.1 m/min | max. 1.3 m/min |

TABLE 1-continued

| | Ex. 1 | Ex. 2 (comp.) | Ex. 3 (comp.) | Ex. 4 (comp.) | Ex. 5 (comp.) | Ex. 6 (comp.) |
|---|---|---|---|---|---|---|
| Fiber impregnation | very good | very good | good | good | very good | very good |
| Surface | very good | very good | streaky, dull | streaky, dull | good | very good |
| Abrasion | No | No | Yes | Yes | No | No |
| Transverse flexural strength >130 MPa | Yes | Yes | No | No | No | No |
| Axial flexural strength >1100 MPa | Yes | Yes | No | No | No | Yes |
| Transverse ILSS >14 MPa | Yes | Yes | No | No | No | No |
| Axial ILSS >70 MPa | Yes | Yes | No | No | No | No |

Ex. 1 corresponds to the inventive composition. The isocyanate-reactive component is solids-free and monophasic and the pultrudate has good processability and good mechanical properties.

Example 2 represents a known system composition which is based on a zeolite (water binder 1), i.e. a solids-containing and thus phase-unstable isocyanate-reactive component. The inventive reactive system has the advantage over this known composition that pumps and filters are not exposed to any solids and transport and processability are easier/better.

Examples 3 and 4 show that systems 1 and 2 without the use of a water binder have poorer processability and poorer mechanical properties. This demonstrates that solids-free, single-phase reactive systems per se are not sufficient to combine good processability with good mechanical properties of the pultrudates obtained.

Example 5 shows that simple substitution of water binder 1 for water binder 2 at otherwise identical composition of the isocyanate-reactive component to example 2 does result in a solids-free system but this does not yet ensure good processability and mechanical properties of the pultrudate. The system moreover remains multiphasic, with the abovementioned disadvantages in processing due to the polyether composition.

Example 6 likewise shows a solids-free, single-phase system. However, it is clear that only an inventive composition of component B) also results in pultrudates having good mechanical properties.

The invention claimed is:

1. A polyurethane reactive system comprising
an isocyanate component A),
an isocyanate-reactive component B) comprising
3-13% by weight of a polyether polyol B1) having a hydroxyl number of 20 to 50 mg KOH/g and comprising a reaction product of a first H-functional starter compound having a functionality f of ≥2 to ≤4 with ethylene oxide and propylene oxide,
15-37% by weight of a polyether polyol B2) having a hydroxyl number of 900 to 1100-mg KOH/g and comprising a reaction product of a second H-functional starter compound having a functionality f of ≥2 to ≤4 with a second alkylene oxide,
50-72% by weight of a polyether polyol B3) having a hydroxyl number of >50 to <900 mg KOH/g and comprising a reaction product of a third H-functional starter compound with a third alkylene oxide,
one or more catalysts B4) and
a drying agent B5),
wherein the sum of the % by weight of the components B1) and B2) amounts to ≤40% by weight based on the sum of the amounts of B), C) and D) and the sum of the % by weight of the components B1), B2), B3), B4) and B5) amounts to ≥90% by weight based on the sum of the amounts of B), C) and D),
an internal release agent C),
and optionally further auxiliary and additive substances D),
wherein the % by weight of the components B), C) and optionally D) sum to 100% by weight,
wherein the hydroxyl numbers of the polyether polyols B1), B2) and B3) are determined according to ISO 14900, and
wherein the isocyanate-reactive component B) exhibits no phase separation, turbidity, or droplet formation over 6 months at room temperature.

2. The polyurethane reactive system as claimed in claim 1, wherein the components A), B), C) and optionally D) are employed in amounts such that the ratio of the number of NCO groups in (A) to the sum of the number of OH isocyanate-reactive groups in (B), (C) and (D) multiplied by 100 has a value of 100-150.

3. The polyurethane reactive system as claimed in claim 1, wherein the amount of drying agent B5) is not more than 5% by weight, based on the sum of the amounts of B), C) and D).

4. The polyurethane reactive system as claimed in claim 1, wherein the amount of drying agent B5) is 0.05% by weight to 5% by weight, based on the sum of the amounts of B), C) and D).

5. The polyurethane reactive system as claimed in claim 1, wherein the drying agent B5) comprises a trialkyl orthoformate, a p-toluenesulfonyl isocyanate, an oxazolidine or a mixture thereof.

6. The polyurethane reactive system as claimed in claim 5, wherein the drying agent B5) comprises an oxazolidine comprising 3-ethyl-2-methyl-2-(3-methylbutyl)-1,3-oxazolidine and/or N-butyl-2-(1-ethylpentyl)-1,3-oxazolidine.

7. The polyurethane reactive system as claimed in claim 1, wherein for the polyether polyol B1) the mass fraction of propylene oxide is 60% to 90% by weight, based on the sum of ethylene oxide and propylene oxide employed.

8. The polyurethane reactive system as claimed in claim 1, wherein the polyether polyol B1) is obtained by a process comprising:

i) reacting the first H-functional starter compound with propylene oxide in the presence of a first catalyst to form a first intermediate ii) reacting the first intermediate with ethylene oxide.

9. The polyurethane reactive system as claimed in claim 8, wherein the first catalyst comprises potassium hydroxide, sodium hydroxide, cesium hydroxide, a double metal cyanide catalyst (DMC catalyst), an amine, or a combination thereof.

10. The polyurethane reactive system as claimed in claim 1, wherein the second alkylene oxide comprises propylene oxide and/or ethylene oxide.

11. The polyurethane reactive system as claimed in claim 1, wherein the third alkylene oxide comprises propylene oxide and/or ethylene oxide.

12. The polyurethane reactive system as claimed in claim 1, wherein the amount of the catalyst B4) is 0.05% by weight to 5% by weight, based on the sum of the amounts of B), C) and D).

13. A polyurethane composite material comprising a fiber material and a polyurethane produced from the polyurethane reactive system as claimed in claim 1.

14. A pultrusion process for producing a polyurethane composite material, comprising:

i) conveying the polyurethane reactive system of claim 1 into an injection box, ii) simultaneously with process step i) introducing the fiber material through the injection box to obtain a fiber material impregnated with the polyurethane reactive system, iii) introducing the fiber material impregnated with the polyurethane reactive system into a heated curing mold, iv) curing the fiber material impregnated with the polyurethane reactive system in the curing mold to obtain a polyurethane pultrudate, v) pulling the polyurethane pultrudate out of the curing mold using a pulling mechanism, and vi) cutting the polyurethane pultrudate pulled from the curing mold to a desired length.

15. A reinforcing profile or structural component or structural element in a vehicle construction, an aircraft construction or a wind power plant comprising the polyurethane composite as claimed in claim 13.

16. The polyurethane reactive system as claimed in claim 1, wherein the isocyanate component A) comprises monomeric methylenedi (phenyl isocyanate) (MDI), oligomeric MDI, polymeric MDI, or a mixture thereof.

17. The polyurethane reactive system as claimed in claim 1, wherein the isocyanate component A) has a NCO content of more than 25% by weight.

18. The polyurethane reactive system as claimed in claim 17, wherein the isocyanate component A) has a functionality of 2.1 to 2.9.

19. The polyurethane reactive system as claimed in claim 18, wherein the isocyanate component A) has a viscosity of ≤500 mPas (at 25° C.) measured according to DIN 53019-1.

20. The polyurethane reactive system as claimed in claim 1, wherein the second alkylene oxide comprises propylene oxide, the third alkylene oxide comprises propylene oxide and the drying agent comprises N-butyl-2-(1-ethylpentyl)-1,3-oxazolidine.

* * * * *